United States Patent Office 3,657,340
Patented Apr. 18, 1972

3,657,340
PROCESS FOR PREPARING SUBSTITUTED
β-HALOACRYLAMIDES
Francis Johnson, Newton, Mass., and Alin H. Gulbenk, Walnut Creek, Calif., assignors to The Dow Chemical Company, Midland, Mich.
No Drawing. Filed Jan. 31, 1969, Ser. No. 795,677
Int. Cl. C07c *103/58*
U.S. Cl. 260—557 R                                   4 Claims

ABSTRACT OF THE DISCLOSURE

Compounds of the formula

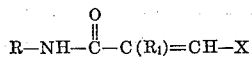

wherein X is chloro, bromo or iodo, R is alkyl, aryl, alkaryl, aralkyl, alkenyl, alicyclic or cycloalkenyl, and $R_1$ is hydrogen, R, carbethoxyl, acetamidyl, or a fluoro, chloro, bromo or hydroxy-substituted R group, are prepared in the novel reaction comprising reacting by contacting an isocyanide of the formula R—NC with a haloacetylene of the formula $XC \equiv C—R_1$, wherein R and $R_1$ have the aforesaid meanings, in the presence of water. The compounds have biological utility as herbicides and insecticides.

SUMMARY OF THE INVENTION

It has now been discovered that compounds of the formula

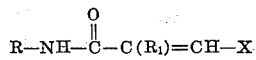

wherein X is chloro, bromo or iodo, R is alkyl, aryl, alkaryl, aralkyl, alkenyl, alicyclic or cycloalkenyl, and $R_1$ is hydrogen, R, carbethoxyl, acetamidyl, or a fluoro, chloro, bromo or hydroxysubstituted R group, are prepared in the novel reaction comprising reacting by contacting an isocyanide of the formula R—NC with a haloacetylene of the formula $XC \equiv C—R_1$, wherein R and $R_1$ have the aforesaid meanings, in the presence of water. The compounds have biological utility as herbicides and insecticides.

A suitable proportion of reactants in the novel process is substantially equimolar quantities of the isocyanide, haloacetylene and water. A preferred proportion is substantially equimolar quantities of isocyanide and haloacetylene and an excess of water.

Suitable isocyanide reactants are those of the known class of compounds having the formula R—NC, wherein R has the aforesaid meaning. The preferred isocyanide reactants are those wherein R is alkyl, alicyclic or aralkyl, and the most preferred reactants are those compounds wherein R has between 1 and about 10 carbon atoms. Examples of such isocyanides include: phenyl, benzyl, allyl, vinyl, 4-butylphenyl, 1-cyclohexenyl, cyclohexyl and t-butyl isocyanide, and other like compounds.

Suitable haloacetylene reactants are those of the known class of compounds having the formula $XC \equiv C—R_1$, wherein X and $R_1$ have the aforesaid meanings. The preferred haloacetylenes are those wherein $R_1$ is hydrogen or Y, wherein Y is alkyl, aryl, alicyclic, or a chloro, bromo or hydroxy-substituted Y group, and the most preferred haloacetylenes are those compounds wherein Y has between 1 and about 10 carbon atoms. Examples of such haloacetylene reactants include:

1-bromoA,
1-chloro-2-chloromethylA,
1-iodo-1-hexyne,
1-iodo-1-hexyn-3-ol,
1-chloro-3-methyl-1-pentyn-3-ol,
1-iodo-2-phenylA,
1chloro-2-(1-hydroxycyclohexyl)A,
1-chloro-3-hydroxy-3-methyl-1-pentyne,
1-bromo-2-(2-chlorophenyl)A,
1-iodo-2-(4-hydroxyphenyl)A,
1-iodo-2-cyclohexylA,
1-bromo-2-(1-cyclohexenyl)A,
1-chloro-2-tolylA,
1-bromo-2-(2-phenylethyl)A,
1-iodo-2-vinylA,
1-chloro-2-(2-ethyl-4-hydroxyphenyl)A,
1-iodo-2-(4-chloro-2-methylphenyl)A,
1-chloro-2-(4-(2-chlorophenyl)butyl)A,
1-iodo-2-(4-(4-hydroxyphenyl)hexyl)A,
1-bromo-2-(4-chlorocyclohexyl)A,
1-iodo-2-(4-hydroxy-1-cyclohexenyl)A,
1-iodo-2-(6-bromo-1-cyclohexenyl)A, wherein "A" in the above examples is acetylene, and other like compounds.

The R and $R_1$ substituents on the reactive isocyanides and haloacetylenes are substantially inert in the subject reaction. Accordingly, R and $R_1$ may take on a wide range of values, as per the above definitions of R and $R_1$. Very large or bulky R and/or $R_1$ substituents, however, may lower the reaction rate due to steric hindrance.

The reaction is suitably carried out at any temperature sufficient to promote the reaction and below the decomposition temperature of the reactants and product. Typically, a suitable temperature is between about —30° C. and about 150° C. A preferred temperature is between about 25° C. and about 90° C. At temperatures below about —30° C., the reaction rate is quite low, and at temperatures above about 150° C., the product yield decreases.

The pressure above the reaction mixture is irrelevant so long as the reaction mixture is liquid. Atmospheric pressure is convenient and therefore preferred.

The reaction is preferably run in solution. A molar excess of water or a suitable aqueous solvent medium is used as a solvent. A suitable aqueous solvent medium is preferred and comprises water and an inert solvent for the isocyanides and/or haloacetylenes. Examples of such inert solvents include: benzene, toluene, xylene, and other like hydrocarbons, and also the preferred compounds which are the water-soluble ethers, esters and alcohols, such as diethyl ether, tetrahydrofuran, ethyl acetate and aliphatic alcohols containing up to about 4 carbon atoms, and other like compounds.

As a general procedure, the isocyanide and haloacetylene reactants are combined in the presence of water or an aqueous solvent medium and the reaction mixture warmed to a suitable reaction temperature and maintained at that temperature until the desired product is formed.

SPECIFIC EMBODIMENTS

The following examples further illustrate the invention:

Procedure

One molar equivalent of isocyanide and one molar equivalent of haloacetylene were dissolved in 5 to 10 times their combined weight in a solvent mixture consisting of 10% water and 90% methanol (percent by total weight basis) in a reaction vessel equipped with a heating means and a condensing means. The reaction mixture was then heated to reflux and maintained at that temperature until the reaction was completed. Then all volatile materials were removed under reduced pressure and the residue dissolved in methylene chloride. The resulting solution was washed once with an equivalent amount of water, dried over magnesium sulfate and the solvent stripped off under reduced pressure. The resultant syrup was dissolved in a minimum amount of methylene chloride and added to a silica gel column wherein the mixture of components was resolved. The unreacted starting material in the mixture were eluted from the column with a 2:1 solvent mixture (by vol.) of methylene chloride:petroleum ether. The desired product was eluted with methylene chloride or a mixture of methylene chloride and diethyl ether. The substituted β-haloacrylamide products were recrystallized in methylene chloride or a mixture of diethyl ether and petroleum ether. The recrystallized products were white, sharp needle-like crystals or powders.

EXAMPLE 1

3-chloro-2-chloromethyl-N-cyclohexylacrylamide

Cyclohexyl isocyanide (1 g.) and 1,3-dichloropropyne (1 g.) were refluxed 24 hrs. in 15 ml. of 10% aqueous methanol. The product (1.1 g.) was recrystallized from diethyl ether-petroleum ether and had an M.P. of 124° C.

*Analysis.*—Calcd. for $C_{10}H_{15}Cl_2NO$ (percent): C, 50.9; H, 6.4; Cl, 30.0; N, 5.9. Found (percent): C, 51.1; H, 6.6; Cl, 30.1; N, 6.0.

Product structure:

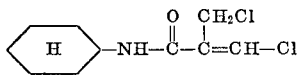

EXAMPLE 2

N-cyclohexyl-2-iodomethylenehexanoamide

Cyclohexyl isocyanide (4.3 g.) and 1-iodo-1-hexyne (8.3 g.) were refluxed for 72 hours in 30 ml. of 10% aqueous methanol. The product (1.9 g.) was recrystallized from ether-petroleum ether and had an M.P. of 105–6°.

*Analysis.*—Calcd. for $C_{13}H_{22}INO$ (percent): C, 46.6; H, 6.6; I, 37.9; N, 4.2. Found (percent): C, 46.6; H, 6.6; I, 38.1; N, 4.3.

Product structure:

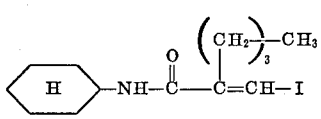

EXAMPLE 3

N-cyclohexyl-3-hydroxy-2-iodomethylenehexanoamide

Cyclohexyl isocyanide (1.1 g.) and 1-iodo-1-hexyn-3-ol (2.2 g.) were refluxed for 72 hours in 25 ml. of 10% aqueous methanol. The product (0.5 g.) was recrystallized from diethyl ether and had an M.P. of 115–7°.

*Analysis.*—Calcd. for $C_{13}H_{22}INO_2$ (percent): C, 44.5; H, 6.3; I, 36.1; N, 4.0. Found (percent): C, 44.6; H, 6.3; I, 36.4; N, 3.9.

Product structure:

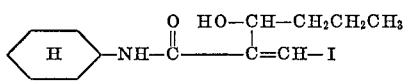

EXAMPLE 4

2-chloromethylene-N-cyclohexyl-3-hydroxyhexanamide

Cyclohexyl isocyanide (2.1 g.) and 1-chloro-1-hexyn-3-ol (2.6 g.) were refluxed for 72 hours in 25 ml. of 10% aqueous methanol. The product (0.8 g.) was obtained without chromatography as white needles from methylene chloride-petroleum ether, M.P. 122–3°.

*Analysis.*—Calcd. for $C_{13}H_{22}ClNO_2$ (percent): C, 60.1; H, 8.5; Cl, 13.6; N, 5.4. Found (percent): C, 59.6; H, 8.5; Cl, 13.6; N, 5.5.

Product structure:

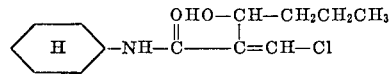

EXAMPLE 5

N-t-butyl-2-chloromethylene-3-hydroxy-3-methylvaleramide t-Butyl isocyanide (1 g.) and 1-chloro-3-methyl-1-pentyn-3-ol (1.3 g.) were refluxed for 48 hours in 10 ml. of 10% aqueous methanol. The product (0.6 g.) was eluted from the silica gel column with ethyl acetate-methylene chloride (1:10 respectively). The shiny white needles were recrystallized from ether-petroleum ether and had an M.P. of 101–4°.

*Analysis.*—Calcd. for $C_{11}H_{20}ClNO_2$ (percent): C, 56.5; H, 8.6; Cl, 15.2; N, 6.0. Found (percent): C, 56.8; H, 8.7; Cl, 15.4; N, 6.0.

Product structure:

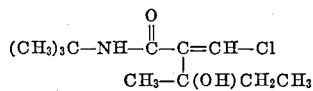

EXAMPLE 6

N-t-butyl-3-chloro-2-chloromethylacrylamide t-Butyl isocyanide (1.7 g.) and 1,3-dichloropropyne (2.2 g.) were refluxed in 15 ml. of 10% aqueous methanol for 72 hours. The product (0.9 g.) was eluted from the silica gel column with methylene chloride. After recrystallization from ether-petroleum ether the acrylamide had a M.P. of 110–1°.

*Analysis.*—Calcd. for $C_8H_{13}Cl_2NO$ (percent): C, 45.7; H, 6.2; Cl, 33.7; N, 6.7. Found (percent): C, 45.6; H, 6.2; Cl, 33.6; N, 6.7.

Product structure:

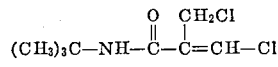

EXAMPLE 7

N-t-butyl-3-iodo-2-phenylacrylamide t-Butyl isocyanide (0.9 g.) and 1-iodo-phenyl-acetylene (2.2 g.) were heated at reflux temperature for five days and then allowed to stand at room temperature for 30 days. The product (0.2 g.) was crystallized from ether-petroleum ether and had an M.P. of 122–3°.

*Analysis.*—Calcd. for $C_{13}H_{16}INO$ (percent): C, 47.4; H, 4.9; I, 38.6; N, 4.3. Found (percent): C, 47.4; H, 4.8; I, 38.6; N, 4.4.

Product structure:

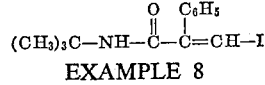

EXAMPLE 8

3-chloro-2-chloromethyl-N-phenylacryl amide

Phenyl isocyanide (1 g.) and 1,3-dichloropropyne (2.2 g.) were allowed to react at room temperature for six days in 5 ml. of 10% aqueous dimethylformamide. The product (0.3 g.) was eluted from the silica gel column with methylene chloride. After recrystallization from methylene chloride-petroleum ether, the amide had an M.P. of 126–7°.

*Analysis.*—Calcd. for $C_{10}H_9Cl_2NO$ (percent): C, 52.2; H, 3.9; Cl, 30.8; N, 6.1. Found (percent): C, 52.0; H, 4.2; Cl, 30.6; N, 6.1.

Product structure:

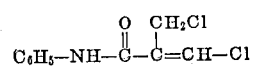

EXAMPLE 9

3-chloro-N-cyclohexyl-2-(1-hydroxycyclohexyl)-acrylamide

Cyclohexyl isocyanide (3 g.) and 1-chloroethnyl-1-cyclohexanol (4.3 g.) were refluxed for 24 hours in 40 ml. of 10% aqueous methanol. Upon cooling the reaction mixture to room temperature, the product (3 g.) precipitated. A portion of the precipitated product (1.6 g.) was insoluble in ether. The ether insoluble portion was recrystallized from ethyl acetate-methylene chloride and had an M.P. of 202–3°.

Analysis.—Calcd. for $C_{15}H_{24}ClNO_2$ (percent): C, 63.0; H, 8.5; Cl, 12.4; N, 4.9. Found (percent): C, 62.6; H, 8.4; Cl, 13.2; N, 4.8.

Product structure:

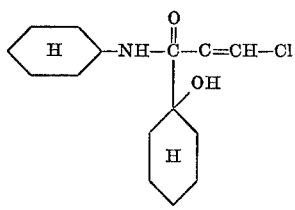

EXAMPLE 10

3-chloro-2(1-cyclohexenyl)-N-cyclohexylacrylamide

The ether soluble portion (1.4 g.) of the product of Ex. 9 was fractionally recrystallized to give white needles with M.P. of 127°.

Analysis.—Calcd. for $C_{15}H_{22}ClNO$ (percent): C, 67.3; H, 8.3; Cl, 13.2; N, 5.2. Found (percent): C, 67.3; H, 8.5; Cl, 13.1; N, 5.2.

Product structure:

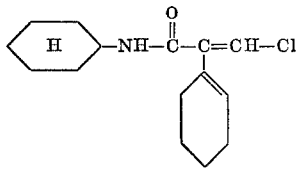

EXAMPLE 11

2-chloromethylene-N-cyclohexyl-3-hydroxy-3-methylvaleramide

Cyclohexyl isocyanide (1.1 g.) and 1-chloro-3-hydroxy-3-methyl-1-pentyne (1.3 g.) were refluxed for 24 hours in 20 ml. of 10% aqueous methanol. The product (0.8 g.) was obtained after chromatography as white needles. Recrystallization from ether gave an M.P. of 102–3°.

Analysis.—Calcd. for $C_{13}H_{22}ClNO_2$ (percent): C, 60.1; H, 8.5; Cl, 13.7; N, 5.4. Found (percent): C, 60.1; H, 8.8; Cl, 14.7; N, 5.6.

Product structure:

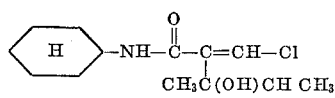

The products of the above examples in aqueous solution or dispersion at a concentration between about 1 and about 1000 parts per million by weight, applied as a spray, are useful as herbicides and/or insecticides.

The products of the above examples are reduced with Raney nickel in a known procedure by warming a solution of the ethylenically unsaturated product and ethanol in the presence of hydrogen and Raney nickel. The products after the reduction are known compounds, e.g. the product of Example 2 was reduced to form N-cyclohexyl-2-methyl-hexanoamide, M.P. 81–82° C.

Analysis.—Calcd. for $C_{13}H_{25}NO$ (percent): C, 73.9; H, 11.9; N, 6.6. Found (percent): C, 73.8; H, 12.1; N, 6.6.

We claim:

1. A process for preparing a compound having the formula

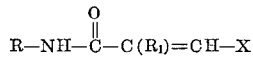

wherein R is alkyl, aryl, alkaryl, aralkyl, alkenyl, cycloalkyl or cycloalkenyl; $R_1$ is hydrogen, a group within the class defined by R, or a fluoro-, chloro-, bromo- or hydroxy-substituted R group; and X is chloro, bromo or iodo; said process comprising reacting by contacting in the presence of water an isocyanide of the formula R—NC with a haloacetylene of the formula $XC{\equiv}C$—$R_1$ wherein R and $R_1$ have the aforesaid meaning.

2. The process defined in claim 1 wherein the reaction temperature is between about −30° C. and about 150° C.

3. The process defined in claim 2 wherein the reaction temperature is between aboutu 25° C. and about 90° C.

4. The process defined in claim 2 wherein the ratio of reactants is substantially equimolar quantities of R—NC and $XC{\equiv}C$-$R_1$, and at least one mole of water per mole of R—NC or $XC{\equiv}C$—$R_1$, wherein R and $R_1$ have the aforesaid meanings.

References Cited

UNITED STATES PATENTS 3,227,542   4/1962   Kurtz et al. _____ 260—561

HENRY R. JILES, Primary Examiner

H. I. MOATZ, Assistant Examiner

U.S. Cl. X.R.

260—558 R, 561 N, 559 R, 562 B, 617 E, 648 R, 651 R, 653.3; 424—324; 71—118